United States Patent
Ott

(10) Patent No.: US 11,161,108 B2
(45) Date of Patent: Nov. 2, 2021

(54) PIPETTING DEVICE, FLUID PROCESSING SYSTEM AND METHOD FOR OPERATING A FLUID PROCESSING SYSTEM

(71) Applicant: TECAN TRADING AG, Mannedorf (CH)

(72) Inventor: Philipp Ott, Steg im Tosstal (CH)

(73) Assignee: TECAN TRADING AG, Mannedorf (CH)

( * ) Notice: Subject to any disclaimer, the term of this patent is extended or adjusted under 35 U.S.C. 154(b) by 363 days.

(21) Appl. No.: 16/307,215

(22) PCT Filed: Jul. 21, 2017

(86) PCT No.: PCT/EP2017/068495
§ 371 (c)(1),
(2) Date: Dec. 5, 2018

(87) PCT Pub. No.: WO2018/015544
PCT Pub. Date: Jan. 25, 2018

(65) Prior Publication Data
US 2019/0291097 A1    Sep. 26, 2019

(30) Foreign Application Priority Data

Jul. 22, 2016 (CH) .......................................... 950/16
Feb. 10, 2017 (CH) .......................................... 159/17
Apr. 19, 2017 (CH) .......................................... 523/17

(51) Int. Cl.
*B01L 3/02* (2006.01)
*G01N 35/10* (2006.01)
(Continued)

(52) U.S. Cl.
CPC ............. *B01L 3/0275* (2013.01); *B01L 3/021* (2013.01); *B01L 3/54* (2013.01); *B01L 9/54* (2013.01);
(Continued)

(58) Field of Classification Search
None
See application file for complete search history.

(56) References Cited

U.S. PATENT DOCUMENTS 5,212,992 A * 5/1993 Calhoun ................. B01L 3/021
                                                 324/690
6,551,558 B1 * 4/2003 Mann ...................... G01F 23/24
                                                 116/109
(Continued)

FOREIGN PATENT DOCUMENTS

EP    2840366 A1    2/2015

OTHER PUBLICATIONS

International Preliminary Report on Patentability and Written Opinion for corresponding PCT application No. PCT/EP2017/068498, dated Jan. 22, 2019.

(Continued)

*Primary Examiner* — Kathryn Wright
(74) *Attorney, Agent, or Firm* — Notaro, Michalos & Zaccaria P.C.

(57) ABSTRACT

A pipetting device having a lube has an opening al one end for suctioning or discharging a sample fluid and can be operatively connected to a pressure generation device at the other end, a first electrode is formed on the pipetting device and forms a measuring capacitor together with a second electrode formed by at least one part of the sample fluid that can be received in the tube and that measuring capacitor is operatively connected to a measuring unit, and the measuring unit is designed to determine a volume of the suctioned or discharged sample fluid according to the capacity of the measuring capacitor, as well as having a first electrical contact that is designed to create an electrical connection (Continued)

with the working fluid, the first electrical contact can be electrically connected to the measuring unit via a low-resistance converter circuit.

19 Claims, 3 Drawing Sheets

(51) Int. Cl.
  *G01F 23/26* (2006.01)
  *B01L 3/00* (2006.01)
  *G01D 5/241* (2006.01)
  *G01N 35/00* (2006.01)
  *B01L 9/00* (2006.01)
  *B25J 9/16* (2006.01)

(52) U.S. Cl.
  CPC .............. *B01L 9/543* (2013.01); *B25J 9/1664* (2013.01); *G01D 5/2417* (2013.01); *G01F 23/263* (2013.01); *G01N 35/0099* (2013.01); *G01N 35/00584* (2013.01); *G01N 35/00732* (2013.01); *G01N 35/1011* (2013.01); *G01N 35/1016* (2013.01); *B01L 2200/0605* (2013.01); *B01L 2200/143* (2013.01); *B01L 2300/021* (2013.01); *B01L 2300/0645* (2013.01); *B01L 2400/049* (2013.01); *G01N 2035/00811* (2013.01); *G01N 2035/103* (2013.01); *G01N 2035/1013* (2013.01); *G01N 2035/1025* (2013.01); *G01N 2035/1034* (2013.01)

(56) References Cited

U.S. PATENT DOCUMENTS

| | | | |
|---|---|---|---|
| 2001/0047692 A1* | 12/2001 | Lipscomb | G01N 35/1016 73/864.25 |
| 2003/0049861 A1 | 3/2003 | Woodward | |
| 2004/0050861 A1* | 3/2004 | Lisec | B01L 3/022 222/57 |
| 2005/0279855 A1* | 12/2005 | Baker | G01N 35/1016 239/71 |
| 2009/0093065 A1 | 4/2009 | Ding et al. | |
| 2009/0117010 A1* | 5/2009 | Bjorson | G01F 23/185 422/400 |
| 2014/0305202 A1* | 10/2014 | Periyathamby | G01F 23/268 73/304 C |

OTHER PUBLICATIONS

International Search Report for corresponding PCT application No. PCT/EP2017/068495, dated Oct. 18, 2017.

* cited by examiner

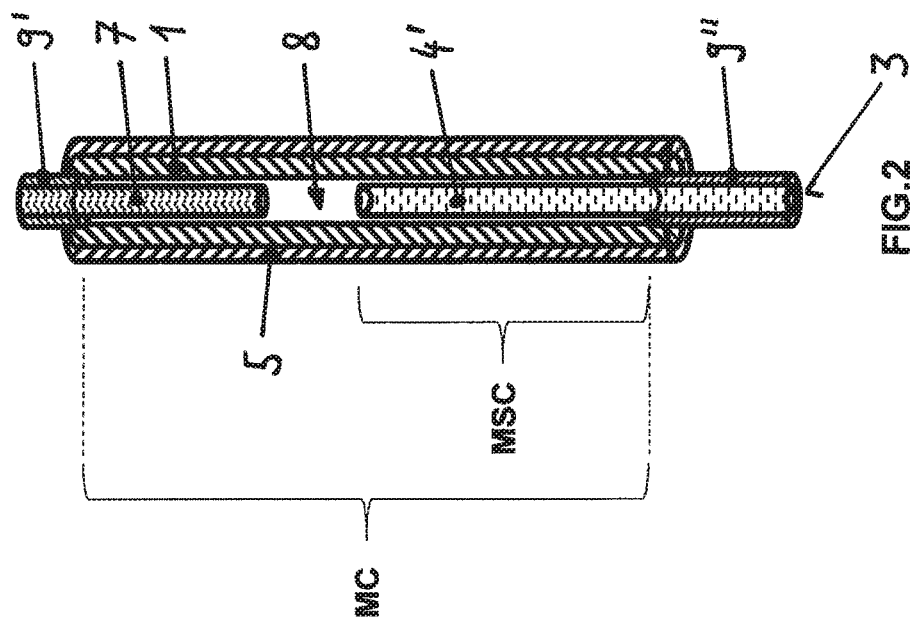
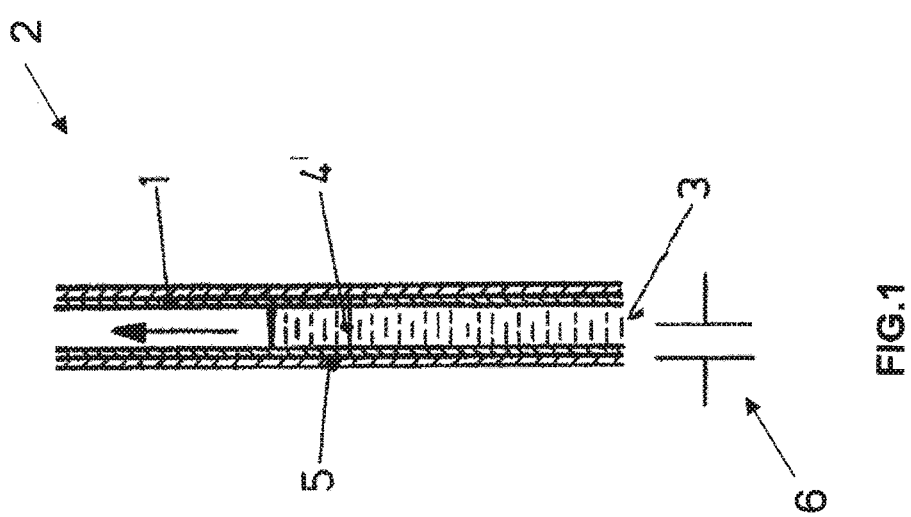

PIPETTING DEVICE, FLUID PROCESSING SYSTEM AND METHOD FOR OPERATING A FLUID PROCESSING SYSTEM

RELATED APPLICATIONS

The present application claims the priority of the Swiss patent application CH 00950/16 with filing date 22 Jul. 2016, the contents of which are hereby incorporated into the present patent application, the priority of the Swiss patent application CH 00159/17 with filing date 10 Feb. 2017, the contents of which are hereby also incorporated into the present patent application, and the priority of the Swiss patent application CH 00523/17 with filing date 19 Apr. 2017, the contents of which are hereby also incorporated into the present patent application.

TECHNICAL FIELD OF THE INVENTION

The present invention relates to the technical field of liquid processing systems and relates in particular to a pipetting device for aspirating (taking up) and dispensing (supplying) liquid volumes, such as liquid samples, for automated laboratory equipment. Furthermore, a liquid processing system comprising a pipetting device and a measuring unit is proposed. Methods are also proposed for operating a liquid processing system in an open and closed loop.

BACKGROUND OF THE INVENTION

When large quantities of samples have to be examined in medical, chemical, analytical or pharmaceutical laboratories, automated laboratory systems or installations are usually used today to enable rapid and reliable processing of each individual sample. Such laboratory systems are often designed as liquid processing systems for handling liquid volumes, and are suitable for performing certain operations with these samples, such as optical measurements, pipetting, washing, centrifuging, incubating and filtering. Such liquid processing systems comprise in particular pipettors both for aspirating and dispensing liquids or dispensers exclusively for dispensing liquids. Most laboratory applications require very precise pipetting operations to achieve satisfactory analytical accuracy. Consequently, precise knowledge of the sample quantities or liquid volumes processed is of decisive importance.

In the Swiss patent application CH 00950/16 with filing date 22 Jul. 2016, a method is proposed which allows an exact determination of a processed (i.e. aspirated or dispensed) volume of liquid during pipetting, as well as a pipetting device which uses this method for a precise determination of the processed sample quantities or liquid volumes.

In systems known so far, this is usually determined indirectly, for example by taking up the sample with a known suction power for a certain period of time. The problem with these indirect methods of volume determination is that it cannot be guaranteed that the desired amount of sample has actually been taken up (or dispensed), because, for example, air (in part) instead of the sample liquid is aspirated or no liquid is aspirated at all because the pipette tip is blocked. Likewise, the effectively absorbed volume depends on the viscosity and surface tension of the sample. Further parameters such as variations in the diameter of the opening of disposable pipette tips also influence the effectively absorbed sample volume.

Known methods of capacitive liquid level detection (cLLD) can be used to determine the level difference between immersion in and emersion from a sample liquid. The aspirated or dispensed volume can be calculated from the level difference and the cross-sectional area of the vessel. However, these methods are too inaccurate for small volumes and large cross-sectional areas. They are therefore only suitable for large volumes. In addition, mechanical tolerances of the height adjustment of the capacitive sensors falsify the measurement of the level difference. Parasitic capacitances can cause an inaccurate determination of the processed sample quantities or liquid volumes.

There is a need for means which allow, among other things, a simple and precise determination of the processed sample quantities or liquid volumes in automated pipetting devices and thus guarantee a high analytical accuracy of the examinations or operations carried out.

SUMMARY OF THE INVENTION

It is an object of the present invention to provide a pipetting device which enables a simple and precise determination of the processed sample quantities or liquid volumes, wherein interferences during the determination are essentially eliminated. This object is achieved according to the invention by the pipetting device defined in claim 1.

It is also an object of the present invention to equip a liquid processing system with the proposed pipetting device in order to provide an apparatus suitable for laboratory systems or installations. This object is solved according to the invention by the liquid processing system according to claim 12.

Specific embodiment variants according to the invention are specified in the dependent claims.

A pipetting device according to the invention comprises a tube, wherein a liquid space of the tube is at least partially filled with a working fluid operatively connectable at a first end of the tube to a pressure-generating means adapted for aspirating or dispensing a sample liquid via an opening provided at a second end of the tube, wherein the working fluid and the sample liquid are electrically insulated from one another via an air gap, wherein a first electrode is formed on the pipetting device which, together with a second electrode formed by at least a part of the sample liquid which can be accommodated in the tube, forms a measuring capacitor which can be operatively connected to a measuring unit, which is designed, depending on the capacitance of the measuring capacitor, to determine a volume of the aspirated or dispensed sample liquid, further comprising a first electrical contact electrically insulated from said first electrode and said second electrode and adapted to establish an electrical connection with said working fluid, wherein the first electrical contact is electrically connectable to said measuring unit via a low-impedance converter circuit.

The present invention allows the sample liquid to be used as one of the two electrodes of a measuring capacitor. In other words, the sample liquid acts as a "liquid electrode". Depending on the amount of sample liquid aspirated or dispensed by the pipetting device, the capacitance of this measuring capacitor changes (i.e. it increases or decreases), whereby the volume of the aspirated or dispensed sample liquid can be determined precisely by means of the measuring unit directly. The sample liquid should have a certain amount of conductivity. The tube itself acts as a dielectric between the two electrodes. By a corresponding design of the tube, inside of which the sample liquid is loaded as second electrode and at whose outer surface the first electrode is applied, for example, also very small volumes can be determined with high accuracy. The two electrodes of the measuring capacitor can have any shape. It is only necessary to establish in advance a link between the capacitance of the measuring capacitor as a function of the sample volume.

Further details are given in the Swiss patent application CH 00950/16 with filing date 22 Jul. 2016, the contents of which are included here.

A metallic first electrical contact on the underside of the tube is electrically connected to the sample liquid. A second electrical contact at the top of the tube is electrically connected to the working fluid and can apply the working fluid to a guard potential. The air gap between the two columns of the sample liquid and the working fluid acts as an electrical insulator. The invention makes at possible that only the column of the sample liquid acts as the electrode relevant for the measuring capacitor.

It should be mentioned that the term sample volume does not only mean the volume of liquid analytical samples, but also volumes of reagents, dilution solutions such as buffer solutions, solvents or suspensions of particles or cells.

In one embodiment of the pipetting device, the low-impedance converter circuit is designed to reduce parasitic capacitances which can be caused by the working fluid.

In a further embodiment variant of the pipetting device, the low-impedance converter circuit is equipped with a high-impedance input and a low-impedance output.

In a further embodiment variant, the pipetting device further comprises a second electrical contact electrically insulated from the first electrode and adapted to establish an electrical connection with the sample liquid upon aspiration or dispensing of the sample liquid such that at least a portion of the sample liquid contained in the tube forms the second electrode of the measuring capacitor, wherein the first electrode is electrically connectable to the measuring unit.

In a further embodiment variant of the pipetting device, the tube is partially or completely covered by the first electrode.

In a further embodiment variant of the pipetting device, the tube, at least in the region of the opening, comprises an electrically conductive material and forms the second electrical contact, or alternatively the tube comprises an electrically non-conductive material which is provided as dielectric of the measuring capacitor.

In a further embodiment variant of the pipetting device, the second electrical contact can be created via a capacitive coupling via the sample liquid, which is loaded in a sample container from which sample liquid can be aspirated or into which sample liquid can be dispensed.

In a further embodiment variant of the pipetting device, the second electrical contact can be connected to the measuring unit, the low-impedance converter circuit or ground via a third switching element.

In a further embodiment variant of the pipetting device, the first electrical contact and the first electrode can each be connected via a first switching element and a second switching element to the measuring unit, the low-impedance converter circuit or ground, wherein physical effects which may have a negative impact on the measurement results are substantially eliminated by switching the respective couplings between the first electrical contact, the first electrode and the second electrical contact to the measuring unit, the low-impedance converter circuit or ground, respectively.

In a further embodiment variant of the pipetting device, the second electrical contact is insulated from ground and is connected to the measuring unit in a state, in which the second electrical contact and the sample liquid are spaced apart from one another or rather the second electrical contact is not immersed in the sample liquid.

In a further embodiment variant of the pipetting device, the second electrical contact is connected to ground and separated from the measuring unit in a state, in which the second electrical contact and the sample liquid are connected to each other or rather the second electrical contact is immersed in the sample liquid.

According to a further aspect of the present invention, a liquid processing system comprises a proposed pipetting device having a measuring unit adapted to determine a volume of the aspirated or dispensed sample liquid depending on the capacitance of the measuring capacitor, and a low-impedance converter circuit, wherein the first electrical contact, which is adapted to establish an electrical connection to the working fluid, and the measuring unit are electrically connected to each other via the low-impedance converter circuit.

In an embodiment variant, the liquid processing system further comprises a pressure-generating means, wherein the pressure-generating means is connected to a controller adapted to, in a closed control loop, based on the volume of aspirated or dispensed sample liquid determined by the measuring unit, and a predetermined target volume of the aspirated or dispensed sample liquid, apply a pressure to the working fluid for aspirating or dispensing of the sample liquid.

In a further embodiment variant, the liquid processing system further comprises a motorized transport unit, such as a robot arm, on which the pipetting device is arranged, wherein the controller is additionally adapted to send signals to the transport unit in order to move the pipetting device such that the opening of the tube is precisely positionable, in particular in a sample container filled with the sample liquid, such as a sample tube or a microplate.

In a further embodiment variant, the liquid processing system further comprises a third switching element which electrically connects the second electrical contact to the measuring unit or disconnects it therefrom.

In a further embodiment variant of the liquid processing system, the third switching element is adapted to electrically connect the second electrical contact to ground or to insulate it therefrom.

In a further embodiment variant of the liquid processing system, the third switching element insulates the second electrical contact from ground in a state, in which the second electrical contact and the sample liquid are spaced apart or rather the second electrical contact is not immersed in the sample liquid.

In a further embodiment variant of the liquid processing system, the third switching element connects the second electrical contact to ground in a state, in which the second electrical contact and the sample liquid are connected to each other or rather the second electrical contact is immersed in the sample liquid.

According to a further aspect of the present invention, a method for operating a proposed liquid processing system in an open loop comprises the steps:
- detecting a state, in which the second electrical contact (9") of the pipetting device contacts the sample liquid (4);
- switching the liquid processing system to volume measurement;
- aspirating the sample liquid (4) by means of the pressure-generating medium; and determining a volume of the aspirated sample liquid (4') as a function of the capacitance of the measuring capacitor.

According to another aspect of the present invention, a method for operating a proposed liquid processing system in a closed control loop comprises the steps:

detecting a state in which the second electrical contact (9") of the pipetting device contacts the sample liquid (4);

switching the liquid processing system to volume measurement; and aspirating the sample liquid (4) by means of the pressure-generating medium based on a predetermined volume signal.

It is expressly pointed out that the above embodiment variants can be combined arbitrary. Only those combinations of embodiment variants that would lead to contradictions due to the combination are excluded.

BRIEF DESCRIPTION OF THE DRAWINGS

Non-limiting embodiment examples of the present invention are explained in more detail below by reference to the figures, wherein:

FIG. 1 shows an enlarged schematic representation of an embodiment example of a pipette tip of a pipetting device according to invention;

FIG. 2 shows a schematic representation of an embodiment example of a pipetting device according to the invention which is operated with a working fluid;

In the figures, same reference numerals relate to same elements.

DETAILED DESCRIPTION OF THE INVENTION

Figure 3A:
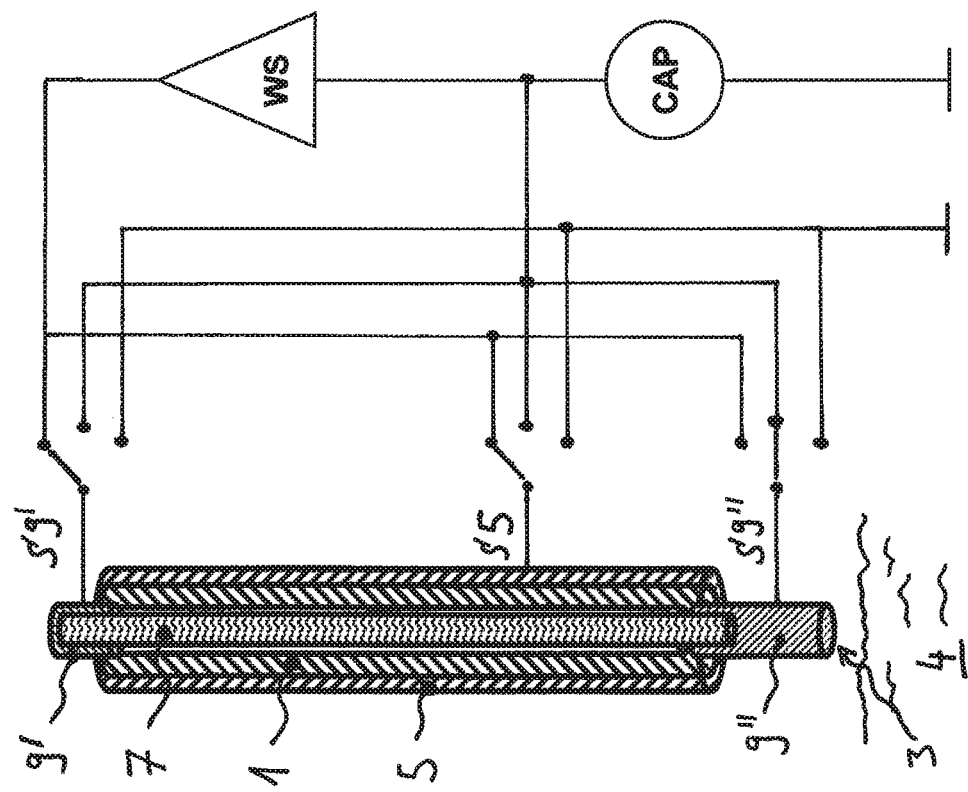
FIG. 3*a*) shows a schematic diagram of an electrical circuit of a pipetting device in a state, in which the pipetting device is not immersed in the sample liquid, FIG. 3*b*) shows the schematic diagram of the electrical circuit of the pipetting device according to FIG. 3*a*) in a state, in which the pipetting device is immersed in the sample liquid.

FIG. 1 shows a highly simplified schematic illustration of an embodiment example of a tube 1 from a pipette tip 2 of a pipetting device. Tube 1, for example, consists of glass or a plastic and is part of pipette tip 2. Although tube 1 is shown as a cylinder with a circular cross-section, it can be any elongated hollow body and can assume any shape in cross-section, e.g. oval, rectangular, etc. A sample liquid 4' is aspirated from a sample container (not shown) into tube 1, or is dispensed therefrom, through an opening 3 at one end of tube 1 into the channel of this tube 1, by, for example, reducing or increasing the pressure in tube 1 by means of a pump, piston or tappet (not shown) which is in liquid communication with the other end of tube 1. Around tube 1, a first electrode 5 is arranged such to cover all or part thereof. This first electrode 5 can, for example, consist of a conductive coating evaporated onto tube 1, e.g. a copper layer, or a conductive foil glued onto tube 1, e.g. a copper foil. This first electrode 5 can be applied to a certain reference potential, e.g. ground. If a different potential is applied to the sample liquid 4' via an electrical contact by means of a voltage source, the first electrode 5 and the sample liquid 4', as a counter electrode (=second electrode), together form a measuring capacitor 6, as schematically indicated by a capacitor circuit symbol. The measuring capacitor 6 has a different capacitance depending on the volume of the sample liquid 4', which is currently loaded in tube 1. Thus, there is a direct correlation between the capacitance of this measuring capacitor 6 and the volume of the sample liquid 4', which is loaded in tube 1, i.e. when aspirating sample liquid, the capacitance increases and when dispensing sample liquid, the capacitance decreases. By determining the capacitance of the measuring capacitor 6 by means of a suitable measuring unit, which includes, for example, a capacitance digital converter (so-called CDC converter, not shown), the volume of the sample liquid 4' in tube 1 can be determined directly.

FIG. 2 shows an example in which a working fluid 7 (also called system liquid) is used for pressure transmission. Tube 1 is partly filled with the working fluid 7 and partly with the sample liquid 4', wherein an air gap 8 is created between the two liquids, which prevents the working fluid 7 from coming into contact with the sample liquid 4'. As shown in the embodiment according to FIG. 2, the (electrically conductive) working fluid 7 is electrically connected via a first electrical contact 9', which is in liquid communication with the working fluid 7. In this case, the first electrical contact 9' is electrically insulated from the first electrode 5 and the second electrode 4' (sample liquid). The first electrical contact 9' can apply a guard potential to the working fluid 7 or rather connect it to a guard potential. Further comprised is a second electrical contact 9" which is in liquid communication with the (electrically conductive) sample liquid 4'. The second electrical contact 9" is also electrically insulated from the first electrode 5. This second electrical contact 9" establishes an electrical connection to the sample liquid 4' when the sample liquid 4' is aspirated or dispensed, so that at least part of the sample liquid 4', which is loaded in tube 1, forms the second electrode of the measuring capacitor. The sample liquid 4' can be applied to ground or rather connected to ground potential via the second electrical contact 9". In one embodiment example, tube 1 can be made of an electrically conductive material, at least in the region of opening 3, and form the second electrical contact 9", or it can consist alternatively of an electrically non-conductive material which can be provided as dielectric of the measuring capacitor.

As further schematically shown in FIG. 2, a measuring capacitance MC (measuring capacitance) can be determined across the area of tube 1 between the first electrical contact 9' and the second electrical contact 9". Furthermore, a measurable capacitance of the sample liquid MSC (measured sample capacitance) can be determined in the area of tube 1 between the highest point of the sample liquid column and the second electrical contact 9". Further, additional measuring ranges can be appended, as explained in more detail below.

Figure 3B:
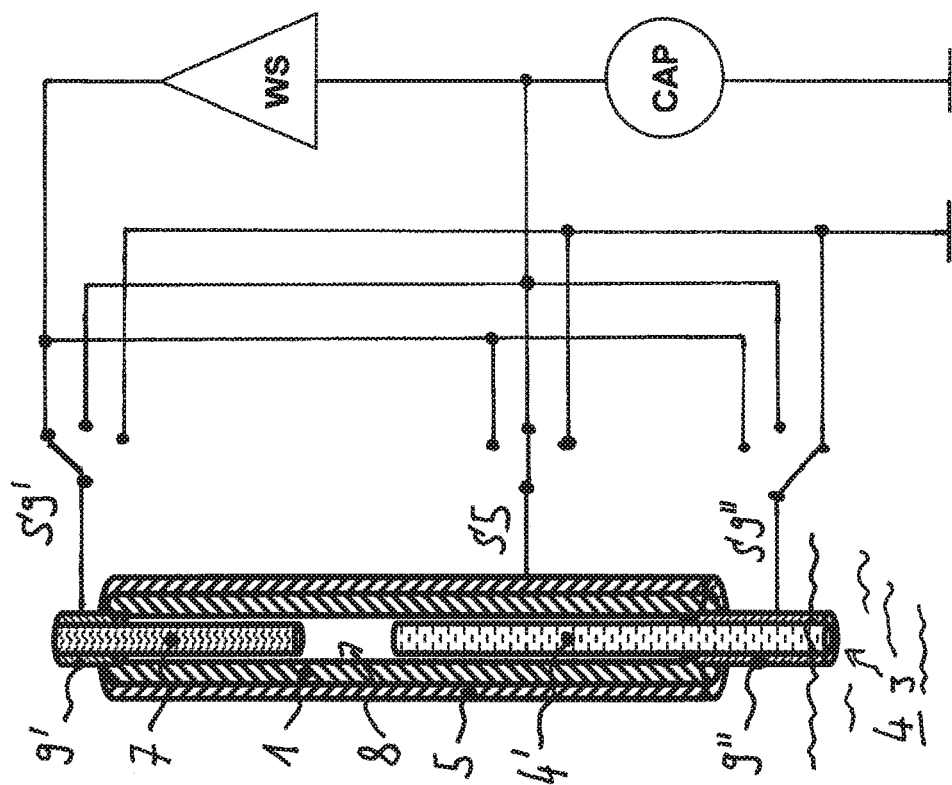

FIGS. 3*a*) and 3*b*) each schematically show an electrical interconnection of the pipetting device. In this case, a state is shown in FIG. 3*a*) in which the pipetting device is not immersed in the sample liquid 4 stored in a sample container, awhile a state is shown in FIG. 3*b*) in which the tube 1 is immersed in the sample liquid 4. It should be noted that throughout the description, the sample liquid stored in the sample container is marked with the reference numeral 4, while the sample liquid stored in the pipetting device is marked with the reference numeral 4'.

Tube 1 is covered by the first electrode 5 and the second electrode is formed by the sample liquid 4' itself (see FIG. 3*b*)).

The first electrical contact 9', the first electrode 5 and the second electrical contact 9''' are each connected via a first switching element S9', a second switching element S5 and a third switching element S9'''. The interconnection by the switching elements S9', S5 and S9''' is exemplary and serves for illustration—any switching can of course be implemented in such a way that it is controlled by a processor, computer or other control device.

The first electrical contact 9' establishes electrical contact to the working fluid 7. A measuring unit CAP (more on this in the following) can be electrically connected to the working fluid 7 via the first electrical contact 9'. For this purpose, the measuring unit CAP can be electrically connected to the first electrical contact 9' via a low-impedance converter circuit WS, wherein switching can be implemented via the first switching element S9'. The low-impedance converter circuit WS is used to reduce parasitic capacitances, which can be caused by the working fluid 7, among other things, and can be provided with a high-impedance input and a low-impedance output. The working fluid 7 can also be connected or switched to ground potential via the first switching element S9'.

The first electrode 5 can be connected to or disconnected from the measuring unit CAP via the second switching element S5. In the state shown in FIG. 3a), the first electrode 5 is separated from the measuring unit CAP, while in the state shown in FIG. 3b) it is connected to the measuring unit CAP (more on this in the following). The first electrode 5 can also be connected to round potential via the second switching element S5. Depending on the capacitance of the measuring capacitor formed, the measuring unit CAP determines a volume of the aspirated or rather dispensed sample liquid 4'. In other words, the measuring unit CAP is used to determine the capacitance of the measuring capacitor and thus the volume of the sample liquid 4' in tube 1. The measuring unit CAP, for example, is a capacitance-to-digital converter (CDC) which converts capacitances into voltages and is based on the sigma-delta converter scheme. In the CDC scheme, the value of an unknown capacitance is determined in Farad as a digital value. Examples of commercially available CDC devices are the FDC1004 from Texas Instruments and the AD7745 from Analog Devices. The measuring unit CAP can be connected to ground at another end.

The second electrical contact 9''' provided an electrical contact to the sample liquid 4', which in turn can be electrically coupled to the measuring unit CAP via the third switching element S9'''. The sample liquid 4' can also be electrically separated from the measuring unit CAP via the third switching element S9''' and connected to ground potential.

In the state shown in FIG. 3a), the pipetting device is not immersed in the sample liquid 4 and serves here for liquid level detection.

In this state, in a mode 1, the second electrical contact 9''' is connected to the measuring unit CAP via the third switching element S9''' and insulated from ground. The second electrical contact 9''' is insulated from ground and connected to the measuring unit CAP in a state, in which the second electrical contact 9''' and the sample liquid 4 are spaced apart from each other or rather the second electrical contact 9''' is not immersed in the sample liquid 4 (liquid level detection). This creates a measuring capacitor between the second contact 9''' at the opening 3 of tube 1 and the sample liquid 4 in the sample container itself. In this state, the sample liquid 4 can be capacitively coupled to ground via the bottom of the sample container in which the sample liquid 4 is loaded. In doing so, a worktable (not shown), on which the sample container is arranged in a sample container carrier, for example, is connected to ground as reference potential. As mentioned above, in liquid level detection, the second electrical contact 9''' is disconnected from ground and connected to the measuring unit CAP, while the second electrode 5 is disconnected from the measuring unit CAP.

After immersion of tube 1 into sample liquid 4 has been detected (see FIG. 3b), the pipetting device switches to the determination of the volume of sample liquid 4' in tube 1. In an exemplary mode 2, the first electrode 5 is connected to the measuring unit CAP and the first electrical contact 9' is connected to the low-impedance converter circuit WS. Furthermore, the third switching element S9''' disconnects the second electrical contact 9''' from the measuring unit CAP and switches the second electrical contact 9''' to ground or applies it to ground potential. Now, by applying the second electrical contact 9''' to ground, influences of a sample container capacitance can be eliminated. Furthermore, by connecting the first electrical contact 9' to the low-impedance converter circuit WS, possible influences due to the working fluid 7 are eliminated.

In summary, the second electrical contact 9''' is connected to ground and disconnected from the measuring unit CAP in a state, in which the second electrical contact 9''' and the sample liquid 4 are connected to each other or rather the second electrical contact 9''' is immersed in the sample liquid 4 in the sample container. In this state, the measuring capacitor is formed between the sample liquid 4' in tube 1 and the first electrode 5, thereby enabling the pipetting device to determine the volume of sample liquid 4' in tube 1 essentially continuously and free of measuring influences.

In other words, parasitic effects can be eliminated by connecting the first electrode 5 to the volume of sample liquid 4' by the measuring unit CAP not before determination thereof, and (essentially) simultaneously disconnecting the second electrical contact 9''' from the measuring unit CAP and applying it to ground. It is irrelevant in this case whether tube 1 is immersed in the sample liquid 4 stored in the sample container or not. A significant advantage is that measurements during pipetting can not only be performed during aspiration, but also during contactless dispensing of the sample liquid 4'. For example, partial sample volumes can be reliably determined for multi-dispense deliveries.

In a first variant of a mode 3, the first electrical contact 9' is connected to the low-impedance converter circuit WS by the first switching element S9', the first electrode 5 is connected to ground by the second switching element S5, and the second electrical contact 9''' is connected to the measuring unit CAP by the third switching element S9'''. This eliminates the possible influence of sample container capacitance by subtracting from mode 1. Furthermore, by connecting the first electrical contact 9' to the low-impedance converter circuit WS, possible influences by the working fluid 7 are eliminated. Since the first electrode 5 is applied to ground, possible influences from laboratory equipment can also advantageously be eliminated. An advantage of the additional modes is that a parallel measured sample container capacitance can be subtracted by means of an alternatingly measured basic capacitance without sample liquid (mode 1).

In a second variant of mode 3, the third electrical contact 9''' can be connected to the measuring unit CAP, while the first electrode 5 and the first electrical contact 9' can be applied to ground (not shown). An active guard would therefore not be necessary. This configuration can be advantageous if a ground connection is applied to the other end of tube 1 and the sample liquid 4 has a high conductivity. By switching advantageously quickly between the first and second variant, possible interferences can be reduced or eliminated. Further details are given below.

There are applications where sample liquids 4' with even a larger volume are aspirated, which can exceed the maximum aspiration volume of tube 1. Here the sample liquid 4' contacts the first electrical contact 9' in addition to the second electrical contact 9" and the air gap 8 has migrated upwards beyond the first electrical contact 9'. In this case it is possible to switch to an exemplary mode 4. In this mode 4, the first electrical contact 9' is connected to the measuring unit CAP by the first switching element S9', the first electrode 5 is connected to ground by the second switching element S5, and the second electrical contact 9" is also connected to the measuring unit CAP by the third switching element S9". A boom (Z-bar) of the pipetting device, which is applied to ground, can serve as the outer electrode. A possible influence of the sample container capacitance can be eliminated by subtracting mode 1. Furthermore, a possible influence of the working fluid 7, which in this example contacts neither the second electrical contact 9" nor the first electrical contact 9', can be eliminated. Furthermore, by applying the first electrode 5 to ground, influences from laboratory equipment are also eliminated.

The different modes described are shown in Table 1 below. The data refer to the way in which the first electrical contact 9', the first electrode 5 and the second electrical contact 9" are coupled by switching one of the respective switching elements S9', S5 and S9", i.e. whether with the low-impedance converter circuit WS, the measuring unit CAP or ground GND. For example, mode 1, as indicated in the table and previously described, means that 9' (first electrical contact) is connected to WS (low-impedance converter circuit) by S9' (first switching element) (switching element S9' is switched upwards), 5 is connected to WS by S5, and 9" is connected to CAP (measuring unit) by S9" (switching element S9" is in the middle).

TABLE 1

| Mode | S9' | S5 | S9" | Application/Purposes |
|---|---|---|---|---|
| 1 | WS | WS | CAP | Immersion detection (before immersion) → No influence by working fluid (concerns S9") or by a laboratory instrument (concerns S5) Sample container capacitance (after immersion) → No influence by working fluid (concerns S9") or by sample liquid (concerns S5) |
| 2 | WS | CAP | GND | Volume measurement of sample liquid MSC A → Influence of sample container capacity (S9" is on ground) and influence of working fluid (S9' coupled with WS) can be eliminated |
| 3 | WS | GND | CAP | Volume measurement of sample liquid MSC B → Influence of the Sample container capacitance can be eliminated by subtracting mode 1; No influence of system liquid (S9' coupled with WS); Possible measurement falsifications by laboratory instrument can be eliminated (first electrode 5 is on ground) |
| 4 | CAP | GND | CAP | Volume measurement of the sample liquid with enlarged measuring capacitor (Z-bar is on ground) → Sample liquid contacts 9" and 9'; air gap is above 9'; Influence of sample container capacitance can be eliminated by subtracting mode 1; Influence of the working fluid can be eliminated (no longer contacted); Possible measurement falsifications by laboratory instrument are eliminated (first electrode 5 is on ground) |

Figure 4:
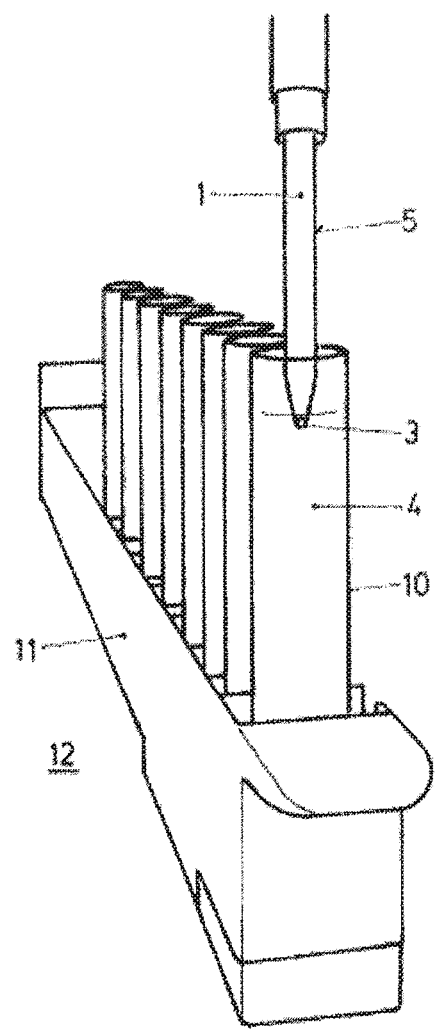
FIG. 4 shows an exemplary sample container carrier of a liquid processing system.

FIG. 4 shows an example of a liquid processing system with a pipetting device in which tube 1 can be covered by a copper foil as the first electrode 5. The sample liquid 4 is loaded in a sample tube 10 as a sample container, which is arranged together with further sample tubes in a sample container carrier 11, which is disposed on a worktable 12. The conductive worktable surface is connected to ground, wherein the sample liquid 4, which is capacitively coupled to the worktable 12, is also connected to ground.

LIST OF REFERENCE NUMERALS

1 Tube
2 Pipette tip
3 Opening in the pipette tip, pipetting opening
4 Sample liquid in the sample container
4' Sample liquid in the tube=second, variable electrode ("liquid electrode") of the measuring capacitor
5 First, fixed electrode of the measuring capacitor
6 Representative measuring capacitor
7 Working fluid or system liquid
8 Air gap
9' First electrical contact for the working fluid
9" Second electrical contact for the sample liquid
10 Sample container, e.g. sample tube
11 Sample container carrier
12 Worktable
CAP Measuring unit
MC Measuring capacitance
MSC Measurable capacitance of the sample liquid
S9' First switching element
S5 Second switching element
S9" Third switching element
WS Low-impedance converter circuit

The invention claimed is:

1. Pipetting device having a tube (1), wherein a liquid space of the tube (1) is at least partially filled with a working fluid (7) operatively connected at a first end of the tube (1) to a pressure-generating means, configured for aspirating or dispensing a sample liquid (4') via an opening (3) provided at a second end of the tube (1), wherein the working fluid (7) and the sample liquid (4') are electrically insulated from one another via an air gap (8), wherein a first electrode (5) is formed on the pipetting device, which, together with a second electrode (4') formed by at least a part of the sample liquid (4') accommodated in the tube, forms a measuring capacitor (6) operatively connected to a measuring unit which is configured, as a function of the capacitance of the measuring capacitor (6), to determine a volume of the aspirated or dispensed sample liquid (4'), the pipette device further comprising a first electrical contact (9') which is electrically insulated from the first electrode (5) and the second electrode (4') and which establishes an electrical connection with the working fluid (7), wherein the first electrical contact (9') is electrically connected to the measuring unit via a low-impedance converter circuit, and wherein the pipette device comprises a second electrical contact (9") electrically insulated from the first electrode (5) and which establishes an electrical connection with the sample liquid (4') upon aspiration or dispensing of the sample liquid (4') such that at least a part of the sample liquid (4') contained in the tube (1) forms the second electrode (4') of the measuring capacitor (6), wherein the first electrode (5) is electrically connected to the measuring unit.

2. Pipetting device according to claim 1, wherein the low-impedance converter circuit reduces parasitic capacitances caused by the working fluid (4').

3. Pipetting device according to claim 1, wherein the low-impedance converter circuit is provided with a high-impedance input and a low-impedance output.

4. Pipetting device according to claim 1, wherein the first electrode (5) partially or completely covers the tube (1).

5. Pipetting device according to claim 1, wherein the tube (1), at least in the region of the opening (3), comprises an electrically conductive material and forms the second electrical contact (9"), or alternatively comprises an electrically non-conductive material which is provided as dielectric of the measuring capacitor.

6. Pipetting device according to claim 1, wherein the second electrical contact (9") is established via a capacitive coupling via the sample liquid (4) which is loaded in a sample container (10) from which sample liquid is aspirated or into which sample liquid is dispensed.

7. Pipetting device according to claim 1, wherein the second electrical contact (9") is connected via a third switching element (S9") to the measuring unit, the low-impedance converter circuit or ground.

8. Pipetting device according to claim 7, wherein further the first electrical contact (9') and the first electrode (5) are each connected via a first switching element (S9') and a second switching element (S5) to the measuring unit, the low-impedance converter circuit or ground, wherein physical effects which have a negative impact on the measurement results are substantially eliminated by switching the respective couplings between the first electrical contact (9'), the first electrode (5) and the second electrical contact (9") to the measuring unit, the low-impedance converter circuit or ground, respectively.

9. Pipetting device according to claim 7, wherein the second electrical contact (9") is insulated from ground and connected to the measuring unit in a state, in which the second electrical contact (9") and the sample liquid (4) are spaced apart from each other or rather the second electrical contact (9") is not immersed in the sample liquid (4).

10. Pipetting device according to claim 7, wherein the second electrical contact (9") is connected to ground and separated from the measuring unit in a state, in which the second electrical contact (9") and the sample liquid (4) are in communication with each other or rather the second electrical contact (9") is immersed in the sample liquid (4).

11. Liquid processing system, comprising a pipetting device according to claim 1, a measuring unit configured to determine a volume of the aspirated or dispensed sample liquid (4') depending on the capacitance of the measuring capacitor, and a low-impedance converter circuit, wherein the first electrical contact (9'), which is configured to establish an electrical connection to the working fluid (7), and the measuring unit are electrically connected to each other via the low-impedance converter circuit.

12. Liquid processing system according to claim 11, further comprising a pressure-generating means, wherein the pressure-generating means is connected to a controller configured to, in a closed control loop, based on the volume of aspirated or dispensed sample liquid (4') determined by the measuring unit, and a predetermined target volume of the aspirated or dispensed sample liquid (4'), apply a pressure to the working fluid (7) for aspirating or dispensing sample liquid (4').

13. Liquid processing system according to claim 11, further comprising a motorized transport unit, in particular a robot arm, on which the pipetting device is arranged, wherein the controller additionally sends signals to the transport unit in order to move the pipetting device such that the opening (3) of the tube (1) is precisely positionable, in particular in a sample container (10) filled with the sample liquid (4), in particular a sample tube or a microplate.

14. Liquid processing system according to claim 11, further comprising a third switching element (S9"') which electrically connects or disconnects the second electrical contact (9") to or from the measuring unit.

15. Liquid processing system according to claim 11, further comprising a third switching element (S9"') which electrically connects or insulates the second electrical contact (9") to or from ground.

16. Liquid processing system according to claim 15, wherein the third switching element (S9"') insulates the second electrical contact (9") from ground in a state, in which the second electrical contact (9") and the sample liquid (4) are spaced apart from each other or the second electrical contact (9") is not immersed in the sample liquid (4).

17. Liquid processing system according to claim 15, wherein the third switching element (S9"') connects the second electrical contact (9") to ground in a state, in which the second electrical contact (9") and the sample liquid (4) are in communication with each other or the second electrical contact (9") is immersed in the sample liquid (4).

18. Method for operating a liquid processing system according to claim 11 in an open control loop, comprising the steps of:
    detecting a state, in which the second electrical contact (9") of the pipetting device contacts the sample liquid (4);
    switching the liquid processing system to volume measurement;
    aspirating the sample liquid (4) by means of the pressure-generating medium; and
    determining a volume of the aspirated sample liquid (4') as a function of the capacitance of the measuring capacitor.

19. Method for operating a liquid processing system according to claim 11 in a closed control loop, comprising the steps of:
    detecting a state, in which the second electrical contact (9") of the pipetting device contacts the sample liquid (4);
    switching of the liquid processing system to volume measurement; and
    aspirating the sample liquid (4) by means of the pressure-generating medium based on a predetermined volume signal.

* * * * *